(12) United States Patent
Bachmann et al.

(10) Patent No.: US 6,397,156 B1
(45) Date of Patent: May 28, 2002

(54) IMPEDANCE MEASUREMENT SYSTEM FOR POWER SYSTEM TRANSMISSION LINES

(75) Inventors: Bernhard Bachmann, Bielefeld (DE); David G. Hart, Raleigh, NC (US); Yi Hu; Damir Novosel, both of Cary, NC (US); Murari M. Saha, Västerás (SE)

(73) Assignee: ABB Inc., Raleigh, NC (US)

( * ) Notice: Subject to any disclaimer, the term of this patent is extended or adjusted under 35 U.S.C. 154(b) by 0 days.

(21) Appl. No.: 09/192,851

(22) Filed: Nov. 17, 1998

(51) Int. Cl.[7] ................................................ G01R 25/00

(52) U.S. Cl. ............................................ 702/65; 702/59

(58) Field of Search ............................ 702/60, 64, 65, 702/59

(56) References Cited

U.S. PATENT DOCUMENTS

| | | | |
|---|---|---|---|
| 3,599,044 A | * 8/1971 | Takemura | 317/127 |
| 4,107,778 A | * 8/1978 | Nii et al. | 364/492 |
| 4,228,476 A | * 10/1980 | Okita et al. | 361/68 |
| 4,313,169 A | * 1/1982 | Takagi et al. | 364/492 |
| 4,321,681 A | * 3/1982 | Sackin et al. | 700/293 |
| 4,438,475 A | * 3/1984 | Haley | 361/82 |
| 4,455,612 A | * 6/1984 | Girgis et al. | 364/483 |
| 4,985,843 A | * 1/1991 | Kotani | 702/59 |
| 5,349,490 A | 9/1994 | Roberts et al. | 361/80 |
| 5,365,396 A | 11/1994 | Roberts et al. | 361/80 |
| 5,515,227 A | 5/1996 | Roberts et al. | 361/67 |
| 5,839,093 A | * 11/1998 | Novosel et al. | 702/59 |

OTHER PUBLICATIONS

A.D. McInnes and I.F. Morrison, "Real Time Calculation of Resistance and Reactance for Transmission Line Protection by Digital Computer," *Elec. Eng. Trans.*, IE, Australia, vol. EE7, No. 1, pp. 16–23.

"Microprocessor Relays and Protection Systems," *IEEE Tutorial Course*, 88EH0269–I–PWR, 1986.

Damir Novosel et al., "Algorithms For Locating Faults On Series Compensated Lines Using Neural Network and Deterministic Methods," 96WM 021–6 PWRD, —Approved for presentation at the 1996 IEEE/PES Winter Meeting, Jan. 21–25, 1996, Baltimore, MD.

Damir Novosel et al., "Locating Faults On Series Compensated Lines Using Intelligent Methods," *Eng. Int. Syst.* vol. 5, No. 4, Dec. 1997, pp. 259–264.

* cited by examiner

*Primary Examiner*—Arthur T. Grimley
*Assistant Examiner*—Mohamed Charioui
(74) *Attorney, Agent, or Firm*—Woodcock Washburn, LLP

(57) ABSTRACT

An accurate impedance measurement method for a power system transmission line is disclosed for improving various protection functions, i.e., distance protection and/or fault location estimation. The method is less sensitive to harmonics and other transient problems introduced to power systems by series capacitance and the like, and is easily incorporated into existing protective relays. In the method, a number (n) of current and voltage samples ($I_k$, $V_k$) representative of values of current and voltage waveforms are measured, respectively, at successive instants of time on a conductor in a power system. The number n is an integer greater than I and the index k takes on values of 1 to n. Resistance (R) and inductance (L) values are computed in accordance with an equation in which R and L are related to sums of differences in values of successive current and voltage samples. A prescribed power system function is then performed based on the computed R and L values.

15 Claims, 2 Drawing Sheets

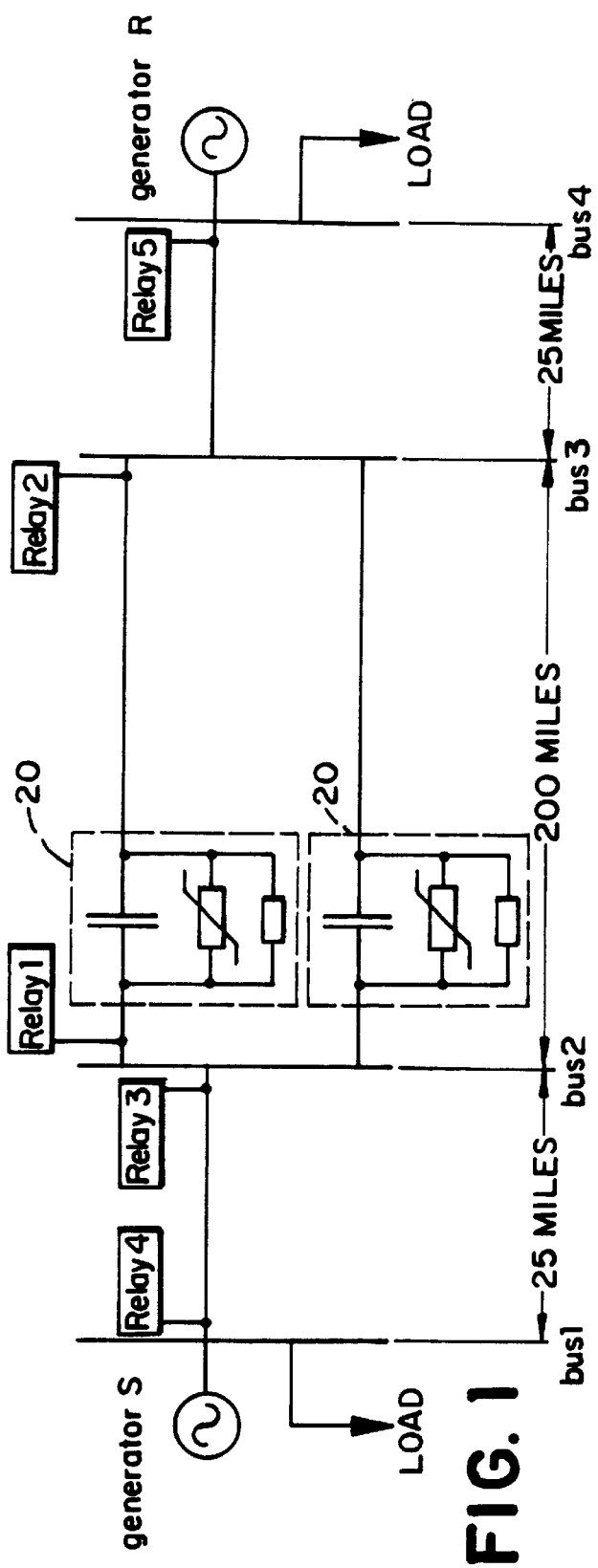
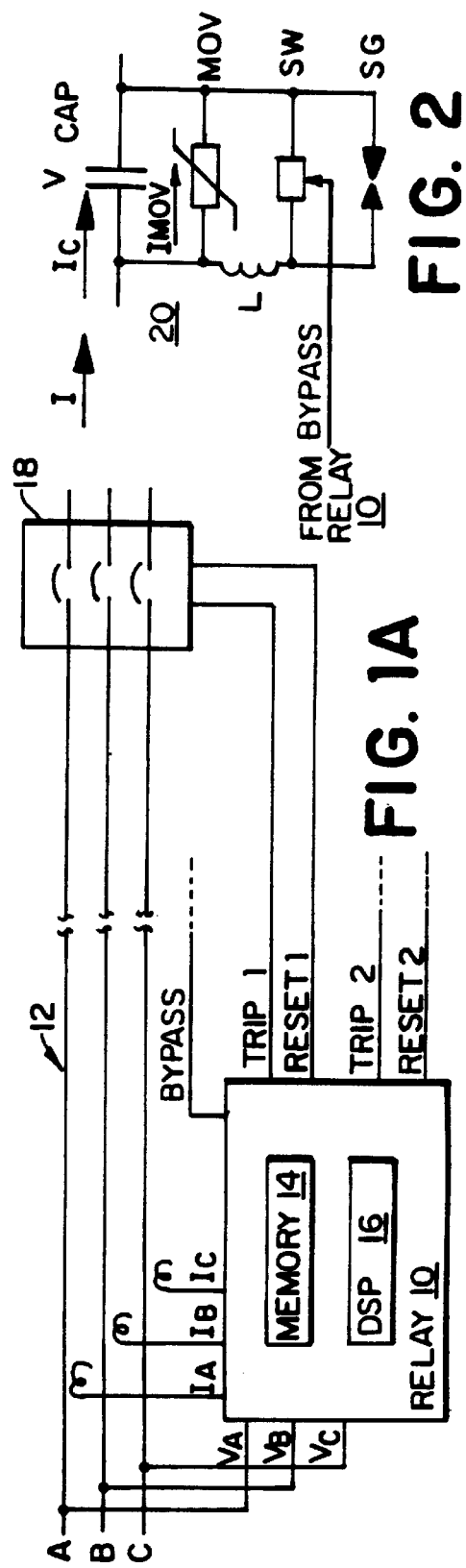
FIG. 1
FIG. 1A
FIG. 2

IMPEDANCE MEASUREMENT SYSTEM FOR POWER SYSTEM TRANSMISSION LINES

FIELD OF THE INVENTION

The present invention relates generally to protective relaying, and more particularly to a method and apparatus for use in connection with a protective relay or like device to accurately measure the impedance of a power system transmission line.

BACKGROUND OF THE INVENTION

In a power distribution system, electrical transmission lines and power generation equipment must be protected against faults and consequent short circuits. Otherwise, such faults and short circuits can cause a collapse of the system, equipment damage, and/or personal injury. Accordingly, and as shown in FIG. 1, a typical power system employs one or more protective relays to monitor impedance and other AC voltage and current characteristics on a protected transmission line, to sense faults and short circuits on such protected line, and to appropriately isolate such faults and short circuits from the remainder of the power system by tripping pre-positioned circuit breakers on such protected line.

As seen, a typical power system can be connected over hundreds of miles and include multiple power generators (generator S, generator R) at different locations. Transmission lines (the main horizontal lines in Fig. 1) distribute power from the generators to secondary lines or buses (the main vertical lines in Fig. 1), and such buses eventually lead to power loads. Importantly, relays and circuit breakers are appropriately positioned to perform the isolating function described above.

A modern protective relay typically records voltage and current waveforms measured on a corresponding protected line, and employs a memory and microprocessor and/or digital signal processor (DSP) to process the recorded waveforms and to estimate impedance and voltage and current phasors based on such processed waveforms. As should be understood, a voltage or current phasor expresses the respective parameter in terms of its magnitude and phase angle. As used herein, the term 'transmission line' includes any type of electrical conductor, such as a high power conductor, feeder, transformer winding, etc. Based on the estimated impedance and voltage and current phasors, the protective relay can then decide whether to trip an associated relay, thereby isolating a portion of the power system.

In particular, and referring now to FIG. 1A, it is seen that a typical protective relay 10 samples voltage and current waveforms $V_A$, $V_B$, $V_C$, $I_A$, $I_B$, $I_C$ from each phase (A–C) of a three phase line 12. Of course, greater or lesser numbers of phases in a line may be sampled. The sampled waveforms are stored in a memory 14 and are then retrieved and appropriately operated on by a processor or DSP 16 to produce the aforementioned estimated impedances and phasors. Based thereon, the relay 10 may then decide that an associated circuit breaker 18 should be tripped to isolate a portion of the line 12 from a fault condition or from other detected phenomena, and issue such a command over a 'TRIP' output ('TRIP 1' in Fig. 1A) that is received as an input to the circuit breaker 18. The relay 10 may then reset the circuit breaker after the relay 10 senses that the fault has been cleared, or after otherwise being ordered to do so, by issuing such a command over a 'RESET' output ('RESET 1' in FIG. 1A) that is received as an input to the circuit breaker 18.

Notably, the relay 10 may control several circuit breakers 18 (only one being shown in FIG. 1A), hence the 'TRIP 2' and 'RESET 2' outputs. Additionally, the circuit breakers 18 may be set up to control one or more specific phases of the line 12, rather than all of the phases of the line 12. Owing to the relatively large distances over which a power system can extend, the distance between a relay 10 and one or more of its associated circuit breakers 18 can be substantial. As a result, the outputs from the relay 10 may be received by the circuit breaker(s) 18 by way of any reasonable transmission method, including hard wire line, radio transmission, optical link, satellite link, and the like.

As seen in FIGS. 1 and 2, transmission lines may oftentimes be series-compensated by series capacitance 20 that includes one or more capacitors or banks of capacitor installations (a representative series capacitor CAP is shown). Benefits obtained thereby include increased power transfer capability, improved system stability, reduced system losses, improved voltage regulation, and better power flow regulation. However, such installation of series capacitance introduces challenges to protection systems for both the series-compensated line and lines adjacent thereto.

In particular, series compensation elements installed within a power system introduce harmonics and non-linearities in such system. Particularly when using waveform-type algorithms (i.e., algorithms that rely on current and voltage waveforms to determine a parameter of interest) to estimate impedance and voltage and current phasors, several transient problems may cause very large errors. Such voltage and current phasors are employed in relaying applications, for example, to determine whether a fault is in a protected zone. It is imperative, then, that such phasor estimates be as accurate as possible in view of installed series capacitance. Examples of the aforementioned transient problems that may cause very large errors include:

DC Offset—In uncompensated and compensated power systems, a fault current waveform will contain an exponentially decaying DC offset component in addition to a fundamental frequency. The amount of the DC offset is dependent on the fault inception angle and system parameters such as network configuration, number and length of transmission lines, compensation percentage, power flow, generator and transformer impedances, etc. A variety of algorithms have been devised to compensate for DC offset. Some algorithms use a differentiation technique that eliminates the effect of the DC offset and ramp components in the fault current waveform. Mimic circuits and cosine filters have also been employed.

Sub-Synchronous Frequencies—On series-compensated lines, series capacitance introduces a sub-synchronous frequency which is dependent on capacitance value and various system values. When a fault occurs, the fault current waveform includes two sinusoids, one oscillating at the predetermined system frequency (50 Hz, 60 Hz, etc.), and the other at the system natural frequency (neglecting system resistance and load current). The system natural frequency is determined by the degree of compensation, the source impedance, and the distance to fault location, among other things. Accordingly, a higher system natural frequency occurs when a fault is closer to a respective relay. The higher frequency will not be as critical for close-in faults since a metal oxide varistor (MOV) associated with the series capacitance (shown in FIG. 2 in parallel with the representative series capacitor (CAP)) will typically short the capacitance in such a situation. However, when a fault occurs farther out from a relay toward the end of a line, the lower system natural frequency will cause the aforementioned voltage and current phasor estimates to oscillate. Such oscillation affects the real and imaginary components of the phasor estimations, resulting in a 'cloud' effect. For most power systems, installed series capacitance results in a sub-synchronous harmonic component in the fault current waveform. The impact of high frequency components in the fault current waveform is usually reduced by low-pass filters in the relay.

MOV and Overload Protection Operation—Once a fault has occurred, a bypass breaker or bypass switch (SW) (shown in FIG. 2 in parallel with the representative series capacitor) closes following operation of an overload protection system. Typically, and as seen, the breaker is controlled by a protective relay 10 via an appropriate BYPASS output (FIG. 1A). Typically, and as shown in FIG. 2, bypassing the installed capacitance in actuality causes an inductance (L) to be placed in parallel with the installed capacitance to form a damping circuit. Accordingly, the closing of such breaker introduces a transient in the system as the breaker arcs and the impedance seen by the relay is altered. As a result, the impedance to the fault increases and the fault current decreases, thus altering the phasor estimates. The quick response of the MOV and overload protection (the spark gap (SG) shown in FIG. 2 in parallel with the representative series capacitor) removes or reduces the capacitance and limits the impact of the sub-frequency component.

Accordingly, a need exists for an impedance measurement system that operates accurately in connection with a power system transmission line, particularly in view of harmonics and non-linearities introduced by installed series compensation elements.

SUMMARY OF THE INVENTION

The present invention satisfies the aforementioned need by providing an accurate impedance measurement method for a power system transmission line. The invention provides improvements to various protection functions, i.e., distance protection and/or fault location estimation. The inventive method is less sensitive than conventional methods to harmonics and other transient problems introduced to power systems by series capacitance and the like. Moreover, existing protective relays can easily incorporate the method in their protection functions, so that the improvements can be achieved with minimal cost.

In the method, a number (n) of current and voltage samples ($I^k$, $V_k$) representative of values of current and voltage waveforms are measured, respectively, at successive instants of time on a conductor in a power system. The number n is an integer greater than 1 and the index k takes on values of 1 to n. Resistance (R) and inductance (L) values are computed in accordance with an equation in which R and L are related to sums of differences in values of successive current and voltage samples. A prescribed power system function is then performed based on the computed R and L values.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a diagrammatic view of a power distribution system having protective relays which perform impedance measurement in accordance with a preferred embodiment of the present invention;

FIG. 1A is a diagrammatic view of a relay employed in connection with the power system shown in FIG. 1, where the relay is coupled to a circuit breaker in accordance with a preferred embodiment of the present invention;

FIG. 2 is a diagrammatic view of a representative series capacitor and related elements employed in connection with the power system shown in FIG. 1;

DETAILED DESCRIPTION OF PREFERRED EMBODIMENTS

The following detailed description of a presently preferred embodiment of the invention considers impedance measurement and determination of fault location for relaying purposes in connection with a transmission line. In particular, the present invention includes a new algorithm for such impedance measurement and fault location determination. However, such algorithm is not restricted to use in connection with a transmission line and may instead be employed in connection with other power system elements without departing from the spirit and scope of the present invention.

Figure 3:
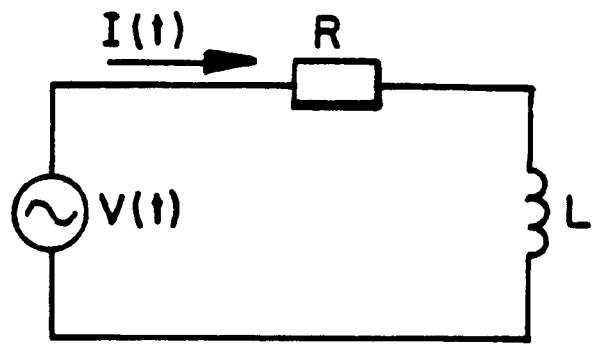
FIG. 3 is a diagrammatic view of a model of a faulted line as a series R–L circuit in accordance with a preferred embodiment of the present invention.

There are several algorithms employed to calculate transmission line impedance. Most of such algorithms are of the waveform type, where the parameter of interest for relaying is in the voltage or current waveform. Another type of algorithm is employed if the parameter of interest is included in the system description rather than the waveform. In A. D. McInnes and I. F. Morrison, "Real Time Calculation of Resistance and Reactance for Transmission Line Protection by Digital Computer," *Elec. Eng. Trans.*, IE, Australia, Vol. EE7, No. 1, pp. 16–23, 1970., and as seen in FIG. 3, the authors model a faulted line as a series R-L circuit where:

$$V(t) = RI(t) + L\frac{dI(t)}{dt}. \tag{1}$$

In the waveform approach, a complex division is required to calculate the impedance using the estimated phasors. An advantage of the differential equation approach of eq. (1) is that the DC offset and the sub-harmonic frequencies are not error signals, since they satisfy the differential equation and hence do not have to be removed. Since measurements are made of V(t) and I(t), a more tractable version of eq. (1) is obtained by integrating over n successive time periods to form:

$$\int_{t_{k-1}}^{t_k} V(t)\,dt = R\int_{t_{k-1}}^{t_k} I(t)\,dt + L(I(t_k) - I(t_{k-1})) \quad (2)$$

$$k = 1, \ldots, n.$$

If the integrals are evaluated using the trapezoidal rule, then a number of different algorithms may be created by varying the number of samples in the intervals. The minimum is 2 samples total, resulting in:

$$\frac{\Delta t}{2}(V(t_k) + V(t_{k-1})) = R\frac{\Delta t}{2}(I(t_k) + I(t_{k-1})) + L(I(t_k) - I(t_{k-1})) \quad (3)$$

$$k = 1, \ldots, n.$$

For n=2, eq. (3) consists of two equations for two unknowns, which can be solved for R and L as follows, where $v_k = V(t_k)$ and $i_k = I(t_k)$:

$$R = \left(\frac{(v_k + v_{k-1})(i_{k-1} - i_{k-2}) - (v_{k-1} + v_{k-2})(i_k - i_{k-1})}{(i_k + i_{k-1})(i_{k-1} - i_{k-2}) - (i_{k-1} + i_{k-2})(i_k - i_{k-1})}\right), \quad (4)$$

$$L = \frac{\Delta t}{2}\left(\frac{(i_k + i_{k-1})(v_{k-1} + v_{k-2}) - (i_{k-1} + i_{k-2})(v_k + v_{k-1})}{(i_k + i_{k-1})(i_{k-1} - i_{k-2}) - (i_{k-1} + i_{k-2})(i_k - i_{k-1})}\right).$$

However, the algorithm incumbent in eq. (4) is very sensitive to signal disturbances, e.g., measurement errors. Such algorithm, including certain stabilization techniques such as averaging (see, e.g., "Microprocessor Relays and Protection Systems," *IEEE Tutorial Course,* 88EHO269-I-PWR, 1986), has been implemented in practice but due to several mis-operations has not found further interest. The method of the present invention, as described below, provides appropriate stabilization to solve the transient problems mentioned above.

In the method of the present invention, for each two new time periods (i.e., k and k-1), eq. (3) gives a new approximation of R and L of the faulted line as modeled in FIG. 3. As discussed above, a simple averaging of the sample by sample approximation will not result in a better prediction of the impedance of the faulted line. Accordingly, the following approach is employed in accordance with a preferred embodiment of the present invention.

If it is assumed that R and L are constant in time, which is true at least before and after a fault occurs, eq. (3) can be formulated for several time intervals (n>2) and the following relationships exist:

$$Ax = b, \text{ with} \quad (5)$$

$$A = \begin{bmatrix} I_1 + I_0 & \frac{2}{\Delta t}\cdot(I_1 - I_0) \\ \vdots & \vdots \\ I_n + I_{n-1} & \frac{2}{\Delta t}\cdot(I_n - I_{n-1}) \end{bmatrix},$$

$$x = \begin{bmatrix} R \\ L \end{bmatrix}, \text{ and}$$

$$b = \begin{bmatrix} V_1 + V_0 \\ \vdots \\ V_n + V_{n-1} \end{bmatrix},$$

where $V_k = V(t_k)$ and $I_k = I(t_k)$ for $k = 0, \ldots, n$. To solve eq. (5), a least squares method is employed since the system of equations is over-determined. After a number of calculations, R and L are determined as:

$$\begin{bmatrix} R \\ L \end{bmatrix} = (A^T A)^{-1} A^T b, \text{ with} \quad (6)$$

$$A^T A = \begin{bmatrix} \sum_{k=1}^{n}(I_k + I_{k-1})^2 & \frac{2}{\Delta t}\cdot\sum_{k=1}^{n}(I_k - I_{k-1})\cdot(I_k + I_{k-1}) \\ \frac{2}{\Delta t}\cdot\sum_{k=1}^{n}(I_k - I_{k-1})\cdot(I_k + I_{k-1}) & \left(\frac{2}{\Delta t}\right)^2\cdot\sum_{k=1}^{n}(I_k - I_{k-1})^2 \end{bmatrix}$$

$$A^T b = \begin{bmatrix} \sum_{k=1}^{n}(I_k + I_{k-1})\cdot(V_k + V_{k-1}) \\ \frac{2}{\Delta t}\cdot\sum_{k=1}^{n}(I_k - I_{k-1})\cdot(V_k + V_{k-1}) \end{bmatrix}.$$

Notably, $A^T A$ in eq. (6) is a 2×2 symmetric matrix and therefore is relatively easily and quickly inverted. The number of time windows needed to stabilize the algorithm is preferably empirically determined. Furthermore, additional algorithm stabilization is achieved by appropriate normalization of each row in eq. (5). For practical implementation, computing time can be reduced drastically by storing appropriate numbers so that for each new sample the number of calculations is minimized. Specifically, $A^T A$ and $A^T b$ may be re-characterized as:

$$A^T A = \begin{bmatrix} a_{11} & a_{12} \\ a_{21} & a_{22} \end{bmatrix} \quad (7)$$

$$A^T b = \begin{bmatrix} b_1 \\ b_2 \end{bmatrix}.$$

By recognizing that $a_{12} = a_{21}$, and by storing and updating $a_{11}, a_{12}, a_{22}, b_1, b_2,$ and $I_k + I_{k-1}, I - I_{k-1}$, and $V_k + V_{k-1}$, (k=1 to n) for each new sample, and by recognizing that the time window over which the summations of eq. (6) takes place is m samples wide, the computation of $A^T A$ and $A^T b$ is preferably accelerated by employing the formulas:

$$a_{11} = a_{11} + (I_n + I_{n-1})^2 - (I_{n-m} + I_{n-m-1})^2, \quad (8)$$

$$a_{22} = a_{22} + \left(\frac{2}{\Delta t}\right)^2 \cdot ((I_n - I_{n-1})^2 - (I_{n-m} - I_{n-m-1})^2),$$

-continued $$a_{12} =$$

$$a_{12} + \frac{2}{\Delta t} \cdot ((I_n - I_{n-1})(I_n + I_{n-1}) - (I_{n-m} - I_{n-m-1})(I_{n-m} + I_{n-m-1})),$$

$$b_1 = b_1 + (I_n - I_{n-1})(V_n + V_{n-1}) - (I_{n-m} - I_{n-m-1})(V_{n-m} + V_{n-m-1}),$$

$$b_2 =$$

$$b_2 + \frac{2}{\Delta t} \cdot ((I_n - I_{n-1})(V_n + V_{n-1}) - (I_{n-m} - I_{n-m-1})(V_{n-m} + V_{n-m-1})).$$

In addition, when computing $a_{11}$, $a_{12}$, $a_{21}$, $a_{22}$, $b_1$, and $b_2$ in accordance with eq. (8), computation time is preferably further reduced by storing particular intermediate calculated data. Accordingly, the present invention can be implemented with real-time performance, and requires less computing time than waveform type algorithms.

Results using data from appropriate simulations show that stabilization over a quarter-cycle is enough to obtain good performance for distance relaying applications. For fault location estimation, the prediction is very accurate when using about a half-cycle. The number of time periods needed for each of these cases depends on the chosen sampling rate. Increasing the sampling rate increases the amount of stored data but not the computing time of the algorithm described by eq. (8).

For a phase-to-ground fault, an impedance relay normally uses a zero sequence compensation current ($I_0$) to account for the ground return voltage drop. This compensation in a faulted current is usually done as follows:

$$I = I_{phase} + k_0 \cdot I_0, \text{ where } k_0 = \frac{Z_0 - Z_1}{Z_1} \quad (9)$$

where $Z_0$ and $Z_1$, are defined as the zero sequence impedance and the positive sequence impedance, respectively.

In order to take into account the zero sequence compensation in the case of phase-to-ground fault, the above-described differential equation algorithm is corrected. For this, $k_0$ is separated into real and imaginary parts such that $k_0 = k_5 + ik_i$. After defining the angular frequency $\omega$ and applying basic calculations, eq. (1) changes to the following:

$$V(t) = R\left(I_{phase}(t) + k_r I_0(t) + \frac{k_i}{\omega} \frac{dI_0(t)}{dt}\right) + \quad (10)$$

$$L\left(\frac{dI_{phase}(t)}{dt} + k_r \frac{dI_0(t)}{dt} - \omega k_i I_0(t)\right).$$

Like the above equations, eq. (10) leads to a least squares problem that is solved by inverting a 2×2 matrix. All of the above considerations in connection with eqs. (2)–(8) also yield for this case, and therefore need not be further discussed here.

Figure 4:
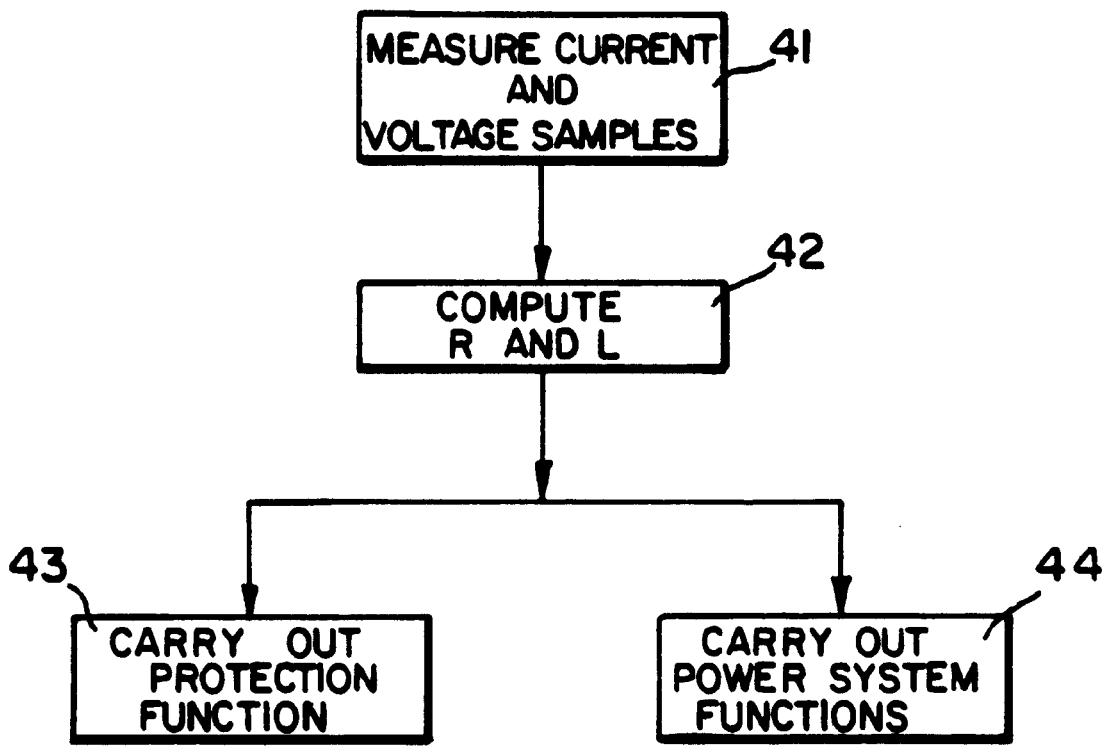
FIG. 4 is a flow chart displaying steps performed for impedance measurement in accordance with a preferred embodiment of the present invention.

With the present invention, impedance and phasors are estimated by first measuring a number (n>1) of current and voltage samples ($I_k$, $V_k$) representative of values of current and voltage waveforms, respectively, at successive instants of time on a conductor in a power system (step 41 of FIG. 4). Such measurements are then employed in connection with eqs. (6)–(8), above, to compute resistance (R) and inductance (L) values in accordance with an equation in which R and L are related to sums of differences in values of successive current and voltage samples (step 42 of FIG. 4). A prescribed power system function is then performed on the basis of the computed R and L values.

Those skilled in the art of protective relaying will recognize that there are a variety of uses for the estimated impedances yielded by the present invention. For example, such impedances may be employed to perform power system protection functions (step 43 in FIG. 4) including level detection for threshold units, direction discrimination, fault distance estimation, out of step detection, and fault location, among others. In addition such impedances may be employed to perform power measurement functions (step 44 in FIG. 4) including voltage, current and power metering, power flow analysis, state estimation, and power system control, among others. It is therefore important that the impedances used in the various processes be accurate. The present invention provides such accurate phasors.

In the foregoing description, it can be seen that the present invention comprises a new and useful impedance measurement system for power transmission lines including series-compensated transmission lines. It will be appreciated by those skilled in the art that changes could be made to the embodiments described above without departing from the broad inventive concepts thereof Thus, for example, except where expressly so limited, the claims are not limited to applications involving three-phase power systems or power systems employing a 50 Hz or 60 Hz frequency. Moreover, the claims are not limited to systems associated with any particular part of a power distribution system, such as a transformer, a feeder, a high power transmission line, etc. It is understood, therefore, that this invention is not limited to the particular embodiments disclosed but it is intended to cover modifications within the spirit and scope of the present invention as defined by the appended claims.

We claim:

1. A protective relaying method for use in connection with a power system comprising electrical conductors carrying current and voltage waveforms, the method comprising the steps of:

measuring a number (n) of current and voltage samples ($I_k$, $V_k$) representative of values of current and voltage waveforms, respectively, at successive instants of time on a conductor in the power system, wherein the number n is an integer greater than 1 and the index k takes on values of 1 to n;

computing resistance (R) and inductance (L) values in accordance with an equation in which R and L are related to sums of differences in values of successive current and voltage samples; and performing a prescribed power system function based on the computed R and L values, wherein R and L are determined in accordance with the following equations:

$$\begin{bmatrix} R \\ L \end{bmatrix} = (A^T A)^{-1} A^T b, \text{ with}$$

$$A^T A = \begin{bmatrix} \sum_{k=1}^{n} (I_k + I_{k-1})^2 & \frac{2}{\Delta t} \cdot \sum_{k=1}^{n} (I_k - I_{k-1}) \cdot (I_k + I_{k-1}) \\ \frac{2}{\Delta t} \cdot \sum_{k=1}^{n} (I_k - I_{k-1}) \cdot (I_k + I_{k-1}) & \left(\frac{2}{\Delta t}\right)^2 \cdot \sum_{k=1}^{n} (I_k - I_{k-1})^2 \end{bmatrix}$$

$$A^T b = \begin{bmatrix} \sum_{k=1}^{n} (I_k + I_{k-1}) \cdot (V_k + V_{k-1}) \\ \frac{2}{\Delta t} \cdot \sum_{k=1}^{n} (I_k - I_{k-1}) \cdot (V_k + V_{k-1}) \end{bmatrix}.$$

wherein $\Delta t$ represents the time period separating successive samples.

2. The method of claim 1 wherein, for each new sample, the elements of the matrices $A^TA$ and $A^Tb$ are computed on the basis of previously computed elements.

3. The method of claim 2 wherein $A^TA$ and $A^Tb$ are re-characterized as:

$$A^TA = \begin{bmatrix} a_{11} & a_{12} \\ a_{12} & a_{22} \end{bmatrix}$$

$$A^Tb = \begin{bmatrix} b_1 \\ b_2 \end{bmatrix};$$

the method further comprising the steps of:
storing and updating $a_{11}$, $a_{12}$, $a_{22}$, $b_1$, $b_2$, and $I_k+I_{k-1}$, $I_k-I_{k-1}$, and $V_k+V_{k-1}$, (K=I to n) for each new sample;
performing the summations of $a_{11}$, $a_{12}$, $a_{22}$, $b_1$, $b_2$, over a time window m samples wide; and
employing the following equations to accelerate the computation of successive values of $a_{11}$, $a_{12}$, $a_{22}$, $b_1$, and $b_2$ based on previous values thereof:

$$a_{11} = a_{11} + (I_n + I_{n-1})^2 - (I_{n-m} + I_{n-m-1})^2,$$

$$a_{22} = a_{22} + \left(\frac{2}{\Delta t}\right)^2 \cdot ((I_n - I_{n-1})^2 - (I_{n-m} - I_{n-m-1})^2),$$

$$a_{12} = a_{12} + \frac{2}{\Delta t} \cdot ((I_n - I_{n-1})(I_n + I_{n-1}) - (I_{n-m} - I_{n-m-1})(I_{n-m} + I_{n-m-1})),$$

$$b_1 = b_1 + (I_n - I_{n-1})(V_n + V_{n-1}) - (I_{n-m} - I_{n-m-1})(V_{n-m} + V_{n-m-1}),$$

$$b_2 = b_2 + \frac{2}{\Delta t} \cdot ((I_n - I_{n-1})(V_n + V_{n-1}) - (I_{n-m} - I_{n-m-1})(V_{n-m} + V_{n-m-1})).$$

4. The method of claim 1 wherein the prescribed power system function is a power system protection function selected from a group consisting of: level detection for threshold units, direction discrimination, fault distance estimation, out of step detection, and fault location.

5. The method of claim 1 wherein the prescribed power system function is a power measurement function selected from a group consisting of: voltage, current and power metering; power flow analysis; state estimation; and power system control.

6. A protective relay for use in connection with a power system comprising electrical conductors carrying current and voltage waveforms, the relay comprising:
a memory storing a number (n) of measured current and voltage samples ($I_k$, $V_k$) representative of values of current and voltage waveforms, respectively, at successive instants of time on a conductor in the power system, wherein the number n is an integer greater than 1 and the index k takes on values of 1 to n; and
a processor computing resistance (R) and inductance (L) values in accordance with an equation in which R and L are related to sums of differences in values of successive current and voltage samples;
wherein the relay performs a prescribed power system function based on the computed R and L values,
wherein the processor determines R and L in accordance with the following equations:

$$\begin{bmatrix} R \\ L \end{bmatrix} = (A^TA)^{-1} A^Tb, \text{ with}$$

-continued $$A^TA = \begin{bmatrix} \sum_{k=1}^{n}(I_k + I_{k-1})^2 & \frac{2}{\Delta t} \cdot \sum_{k=1}^{n}(I_k - I_{k-1}) \cdot (I_k + I_{k-1}) \\ \frac{2}{\Delta t} \cdot \sum_{k=1}^{n}(I_k - I_{k-1}) \cdot (I_k + I_{k-1}) & \left(\frac{2}{\Delta t}\right)^2 \cdot \sum_{k=1}^{n}(I_k - I_{k-1})^2 \end{bmatrix}$$

$$A^Tb = \begin{bmatrix} \sum_{k=1}^{n}(I_k + I_{k-1}) \cdot (V_k + V_{k-1}) \\ \frac{2}{\Delta t} \cdot \sum_{k=1}^{n}(I_k - I_{k-1}) \cdot (V_k + V_{k-1}) \end{bmatrix}.$$

wherein $\Delta t$ represents the time period separating successive samples.

7. The relay of claim 6, wherein, for each new sample, the processor computes the elements of the matrices $A^TA$ and $A^Tb$ on the basis of previously computed elements.

8. The relay of claim 7 wherein the processor re-characterizes $A^TA$ and $A^Tb$ as:

$$A^TA = \begin{bmatrix} a_{11} & a_{12} \\ a_{12} & a_{22} \end{bmatrix}$$

$$A^Tb = \begin{bmatrix} b_1 \\ b_2 \end{bmatrix};$$

the processor storing and updating $a_{11}$, $a_{12}$, $a_{22}$, $b_1$, $b_2$, and $I_k+I_{k-1}$, $I_{k-Ik-1}$, and $V_k+V_{k-1}$, (k=I to n) for each new sample;
the processor performing the summations of $a_{11}$, $a_{12}$, $a_{22}$, $b_1$, $b_2$, over a time window m samples wide; and
the processor employing the following equations to accelerate the computation of successive values of $a_{11}$, $a_{12}$, $a_{22}$, $b_1$, and $b_2$ based on previous values thereof:

$$a_{11} = a_{11} + (I_n + I_{n-1})^2 - (I_{n-m} + I_{n-m-1})^2,$$

$$a_{22} = a_{22} + \left(\frac{2}{\Delta t}\right)^2 \cdot ((I_n - I_{n-1})^2 - (I_{n-m} - I_{n-m-1})^2),$$

$$a_{12} = a_{12} + \frac{2}{\Delta t} \cdot ((I_n - I_{n-1})(I_n + I_{n-1}) - (I_{n-m} - I_{n-m-1})(I_{n-m} + I_{n-m-1})),$$

$$b_1 = b_1 + (I_n - I_{n-1})(V_n + V_{n-1}) - (I_{n-m} - I_{n-m-1})(V_{n-m} + V_{n-m-1}),$$

$$b_2 = b_2 + \frac{2}{\Delta t} \cdot ((I_n - I_{n-1})(V_n + V_{n-1}) - (I_{n-m} - I_{n-m-1})(V_{n-m} + V_{n-m-1})).$$

9. The relay of claim 6 wherein the prescribed power system function is a power system protection function selected from a group consisting of: level detection for threshold units, direction discrimination, fault distance estimation, out of step detection, and fault location.

10. The relay of claim 6 wherein the prescribed power system function is a power measurement function selected from a group consisting of: voltage, current and power metering; power flow analysis; state estimation; and power system control.

11. A power system comprising electrical conductors carrying current and voltage waveforms and a protective relay comprising:
a memory storing a number (n) of measured current and voltage samples ($I_k$, $V_k$) representative of values of current and voltage waveforms, respectively, at successive instants of time on a conductor in the power system, wherein the number n is an integer greater than 1 and the index k takes on values of 1 to n; and a processor computing resistance (R) and inductance (L) values in accordance with an equation in which R and L are related to sums of differences in values of successive current and voltage samples;

wherein the relay performs a prescribed power system function based on the computed R and L values, wherein the processor determines R and L in accordance with the following equations:

$$\begin{bmatrix} R \\ L \end{bmatrix} = (A^T A)^{-1} A^T b, \text{ with}$$

$$A^T A = \begin{bmatrix} \sum_{k=1}^{n}(I_k + I_{k-1})^2 & \frac{2}{\Delta t} \cdot \sum_{k=1}^{n}(I_k - I_{k-1}) \cdot (I_k + I_{k-1}) \\ \frac{2}{\Delta t} \cdot \sum_{k=1}^{n}(I_k - I_{k-1}) \cdot (I_k + I_{k-1}) & \left(\frac{2}{\Delta t}\right)^2 \cdot \sum_{k=1}^{n}(I_k - I_{k-1})^2 \end{bmatrix}$$

$$A^T b = \begin{bmatrix} \sum_{k=1}^{n}(I_k + I_{k-1}) \cdot (V_k + V_{k-1}) \\ \frac{2}{\Delta t} \cdot \sum_{k=1}^{n}(I_k - I_{k-1}) \cdot (V_k + V_{k-1}) \end{bmatrix}.$$

wherein $\Delta t$ represents the time period separating successive samples.

12. The power system of claim 11 wherein, for each new sample, the processor computes the elements of the matrices $A^T A$ and $A^T b$ on the basis of previously computed elements.

13. The power system of claim 12 wherein the processor re-characterizes $A^T A$ and $A^T b$ as:

$$A^T A = \begin{bmatrix} a_{11} & a_{12} \\ a_{12} & a_{22} \end{bmatrix}$$

$$A^T b = \begin{bmatrix} b_1 \\ b_2 \end{bmatrix};$$

the processor storing and updating $a_{11}$, $a_{12}$, $a_{22}$, $b_1$, $b_2$, and $I_k + I_{k-1}$, $I_k - I_{k-1}$, and $V_k + V_{k-1}$, (k=1 to n) for each new sample;

the processor performing the summations of $a_{11}$, $a_{12}$, $a_{22}$, $b_1$, $b_2$, over a time window m samples wide; and the processor employing the following equations to accelerate the computation of successive values of $a_{11}$, $a_{12}$, $a_{22}$, $b_1$, and $b_2$ based on previous values thereof:

$$a_{11} = a_{11} + (I_n + I_{n-1})^2 - (I_{n-m} + I_{n-m-1})^2,$$

$$a_{22} = a_{22} + \left(\frac{2}{\Delta t}\right)^2 \cdot ((I_n - I_{n-1})^2 - (I_{n-m} - I_{n-m-1})^2),$$

$$a_{12} = a_{12} + \frac{2}{\Delta t} \cdot ((I_n - I_{n-1})(I_n + I_{n-1}) - (I_{n-m} - I_{n-m-1})(I_{n-m} + I_{n-m-1})),$$

$$b_1 = b_1 + (I_n - I_{n-1})(V_n + V_{n-1}) - (I_{n-m} - I_{n-m-1})(V_{n-m} + V_{n-m-1}),$$

$$b_2 = b_2 + \frac{2}{\Delta t} \cdot ((I_n - I_{n-1})(V_n + V_{n-1}) - (I_{n-m} - I_{n-m-1})(V_{n-m} + V_{n-m-1})).$$

14. The power system of claim 11 wherein the prescribed power system function is a power system protection function selected from a group consisting of: level detection for threshold units, direction discrimination, fault distance estimation, out of step detection, and fault location.

15. The power system of claim 11 wherein the prescribed power system function is a power measurement function selected from a group consisting of: voltage, current and power metering; power flow analysis; state estimation; and power system control.

* * * * *